Oct. 8, 1974  J. JANSTA ET AL  3,840,454

ELECTROLYTIC HYDROGEN SOURCE

Filed Aug. 9, 1972

2 Sheets-Sheet 2

United States Patent Office 3,840,454
Patented Oct. 8, 1974

---

3,840,454
ELECTROLYTIC HYDROGEN SOURCE
Jiri Jansta, Kostelec nad Labem, and Otokar Lasota, Prague, Czechoslovakia, assignors to Ceskoslovenska Akademie Ved, Prague, Czechoslovakia
Filed Aug. 9, 1972, Ser. No. 278,998
Claims priority, application Czechoslovakia, Aug. 13, 1971, 5,890/71; Sept. 28, 1971, 6,892/71
Int. Cl. B01k 3/00
U.S. Cl. 204—230     7 Claims

ABSTRACT OF THE DISCLOSURE

An electrolytic hydrogen source with a proportional gas generation control, comprising a porous electrode made of an electrochemically active porous layer of material of which hydrophilic surface has a low overpotential for hydrogen generation, and a physically effective cover layer of hydrophilic material having a higher overpotential for hydrogen generation, or of an electrically-non-conductive material. The source is designed for plants with a relatively low consumption of highly pure hydrogen and may also serve as a leakage indicator when installed in apparatuses with zero gas offtake.

BACKGROUND OF THE INVENTION

The present invention relates to an electrolytic hydrogen source with proportional gas generation control which source is suitable for use in plants with minor hydrogen consumption, or where it is necessary to maintain a constant pressure in a particular apparatus and to compensate for a possible leakage.

In the technical, especially laboratory practice, it is sometimes necessary to make use of minor volumes of extremely pure hydrogen, frequently at outputs approaching to zero, under constant, precise and long-termed superatmospheric overpressure, such as, for example for reduction atmospheres in apparatuses, containers, gas electrodes, with laboratory hydrogenation processes and the like. To such purposes there is usually employed electrolytic hydrogen taken off from pressure cylinders while the pressure is reduced, as a rule, by means of reduction valves and manostats. If considering a relatively small hydrogen consumption, problems are often encountered in manipulation with gas flasks. Moreover the location and the attendance of gas pressure cylinders are subject to severe safety regulations. The precise control of the pressure and the long-termed maintenance thereof by means of mechanical manostat is not reliable, and with outputs approaching to zero almost impossible without using a by-pass. All the same, the pressure cannot be prevented from fluctuating about the respective preset value, which results from the very principle of mechanical control.

In accordance with another method, it is possible to use as hydrogen source one of the present electrolyzers for water dissociation. Unfortunately, hydrogen taken off therefrom is contaminated, as a rule, by an amount of as much as 0.2 percent of oxygen and contains in addition a substantial portion of electrolyte aerosol. Moreover such hydrogen has the atmospheric pressure. Provided hydrogen is prepared in a pressure electrolyzer, oxygen has simultaneously to be taken off in an amount proportional to the hydrogen offtake, with regard to the volume ratio of the two gases in water, which operation requires a relatively complicated control.

In order to get separate offtakes of hydrogen and oxygen, it is necessary to provide a porous electrode for cathodic hydrogen evolution, which electrode operates upon two well known principles. One of them is based upon the fact that the potential necessary for electrolytic hydrogen generation on the surface of electronically conductive materials differs in a very large extent. The value of hydrogen overpotential depends upon the quality and condition of the electrode surface. If two materials having different hydrogen overpotential, such as, for instance, Cu and Ni, are cathodically polarized in an alkaline medium to the same potential, hydrogen is preferably produced on nickel.

There are also known hydrophilic porous electrodes used in galvanic fuel elements. An escape of the gas through the porous layer of the electrode into the ambient electrolyte can be prevented by coating the active layer thereof with the so-called cover layer which is porous and hydrophilic as to ensure, once filled up with the electrolyte, a ionic communication between the active layer and the counterelectrode in the cell. No one of its pores, however, has a radius larger than $r$ and therefore all of them are filled up with the electrolyte which is forced thereinto, due to a capillary pressure $p$ resulting from the well known formula $p = 2\sigma \cos \alpha / r$ in which $\sigma$ is surface tension and $\alpha$ is a wetting angle. If the gas pressure behind the cover layer does not exceed the value $p$ it is not in a position to force the electrolyte out of the pores and thus escape into the ambient electrolyte.

It has already been proposed to prepare the cover layer of the electrode from a metal having a high hydrogen overpotential, such as, e.g., Cu and Pb, and the active layer thereof of a metal with low overpotential (Ni). In this case hydrogen is generated in the active layer only, cannot penetrate the cover layer, and thus can be withdrawn from the active layer at an overpressure up to the above-mentioned pressure value $p$.

It is an object of the present invention to provide an electrolytic source of highly pure hydrogen for devices with a minor hydrogen consumption, where it is necessary to keep the constant pressure very precisely as well as to compensate for possible gas leaks. The hydrogen source according to the invention is able to deliver hydrogen without electrolyte aerosol, without oxygen traces and, due to a better connection between the active and the cover layer of the porous electrode, there is attained a longer lifetime which favorably influences the economy of the process.

The purpose of the present invention and the basic object of the same is to overcome the aforementioned disadvantages and to significantly improve the electrolytic hydrogen source.

SUMMARY OF THE INVENTION

In accordance with one feature of our invention we provide an electrolytic hydrogen source with a proportional gas generation control, comprising porous electrodes possessing an electrochemically active porous layer of material of which hydrophilic surface has a low overpotential for hydrogen generation, and a cover layer of hydrophilic material having a higher overpotential for hydrogen generation. The hydrogen source is characterised, according to the invention in that the porous electrodes, including their support, constitute, after their being wetted with an electrolyte a pressurized volume, gas tight up to a hydrogen overpressure, with respect to a pressure on the level of the electrolyte equalling $\Delta_p = 2\delta \cdot \cos a/r$ in which $\delta$ is surface tension of the electrolyte, $\alpha$ is an angle of wetting the material of electrode surface with the electrolyte, and $r$ is radius of the pores in the coverlayer of the electrode. The outlet of the pressurized cover is adapted to communicate with a pressure gauge equipped with a scanner for proportionally scanning deviations from the preset pressure value while the outlet of said pressure gauge is in turn connected to an electrolytic current controlling element whereby a closed control circuit is formed. The active layer of porous electrode may optionally be connected with the cover layer by an interlayer, contains two mutually superimposed penetrating pore systems of which the one contains pores up to 3 $\mu$m. size, while the other contains pores, the size of which is 5 $\mu$m. larger than that of pores of the first system.

It is known that hydrogen, generated using any electrode containing the active layer with a similar porous structure, contains only a little of electrolyte aerosol, owing to a special mechanism of gas evolution. But in addition to this, the specified structure is optimal one from the point of the largest inner surface accessible to the electrochemical hydrogen evolution. It results in a very low polarization of the electrode at a given current density which is very important for evolution of all hydrogen exclusively in the catalytic layer and none on the outer surface of the cover layer.

The electrolyser of the hydrogen generator comprises at least one vessel unit provided with a cover in which at least one porous electrode is gas-tightly secured. The covers of the particular vessel units are provided with means for easy and immediate mutual gas-tight connection to a lighter assembly (modular construction). The control appliance constituted by the pressure gauge and the electrolytic current controlling element operates continuously within the range of from zero to the maximum of the preset value. The proportional scanner of deviations from the preset value is preferably of a photoelectric type, and the pressure gauge is equipped with means for indicating a limit value of said deviation. Then a regulated hydrogen evolution can be interrupted automatically e.g. in the case of an accidental rise of gas consumption. The scale of an amperemeter connected into the electrolytic current circuit can be also calibrated in units of volume of the gas being generated (0° C., 760 mm. Hg) vs. units of time. This is possible only in view of the fact that all hydrogen is evolved in the gas-tight space of the electrodes according to the invention. The scale can be moreover marked with a band of critical leakage to signal a dangerous hydrogen concentration in the ambient atmosphere.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DECRIPTION OF THE DRAWING

Figure 1:
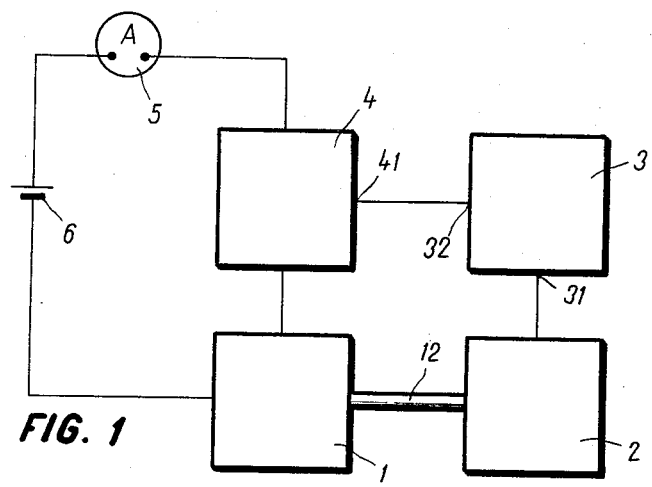
FIG. 1 is a block diagram of the electrolytic source according to the invention.

FI. 4 is the scale of the pressure gauge shown in FIG. 1.

DESCRIPTION OF THE PREFERRED EMBODIMENTS

Discussing now the drawing in detail, and particularly FIG. 1 thereof, it can be seen that the reference numeral 1 indicates an electrolyzer which is interconnected within a circuit comprising a series-connected electrolytic current controlling element 4, an ampere-meter 5 and a power source 6. The hydrogen offtake of the electrolyzer 1 communicates via a connecting pipe 12 with a pressure gauge 2 equipped with a scanner designed for scanning proportional deviations from the desired pressure value. The output of the scanner in the pressure gauge 2 is connected with the input 31 of an amplifier 3 of which output 32 is in turn connected with the control input of the electrolytic current controlling element 4.

Figure 2:
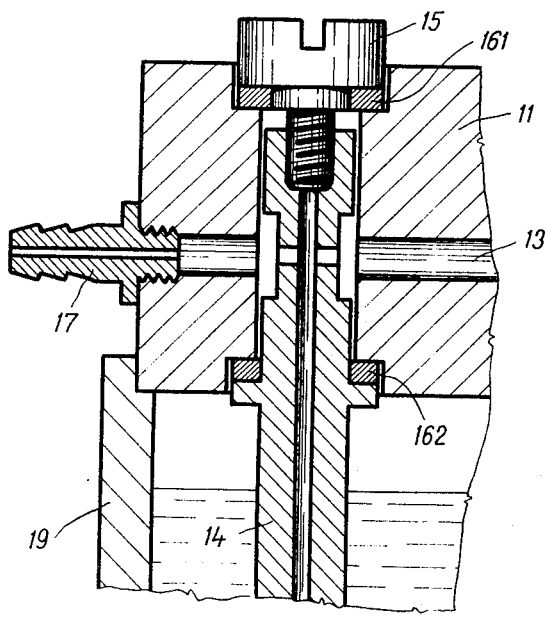
FIG. 2 is an axial sectional view of the main vessel together with a porous electrode secured in the cover thereof.

In FIG. 2, the reference numeral 11 denotes the cover of a main vessel 19, which cover 11 is provided with a duct 13 for hydrogen passage and with means for providing an immediate connection of the said cover 11 with another cover 11, or for withdrawing hydrogen, such as a nipple 17. The cover 11 is further provided with a central port to receive the stem 14 of a porous electrode secured therein by means of a grub screw 15 and sealed by sealing rings 161, 162.

Figure 3:
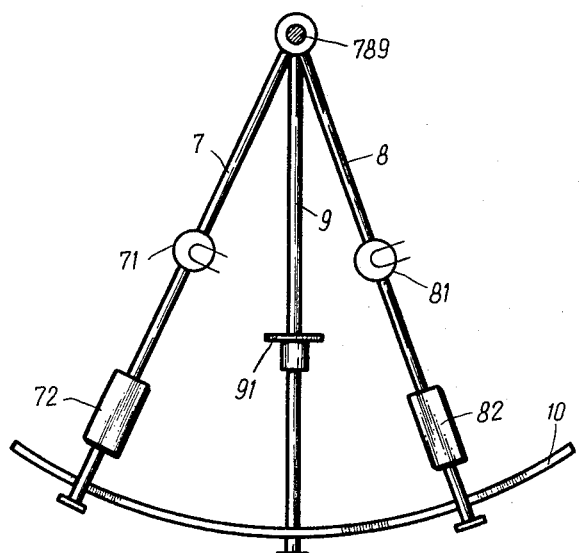
FIG. 3 shows a pressure gauge equipped with a photoelectric scanner.

As it is apparent from FIG. 3 showing schematically the pressure gauge, an arm 9 of the actual value index carries a shutter 91 designed for screening, during the pressure rise, gradually a beam emitted from a light source, such as, for instance, a bulb 71, and directed towards a photoelectric cell 72 supported on an arm 7 of the maximum pressure decrease index. At the end of its counterdirectional swing movement, the shutter 91 on the arm 9 will gradually screen a light beam between a source of light 81 and a photoelectric cell 82 provided on an arm 8 of the preset pressure value index. This gradual screening of the light beam brings about a proportional decrease of the electrolytic current; the increase of the gas overpressure and then also the movement of the arm 9 gets slower. The value of the hydrogen overpressure approaches asymptomatically the preset value and once reached it is kept constant without any fluctuations and quantity of hydrogen evolved is equal to a volume of hydrogen just taken away from the generator at the preset overpressure. The positions of the particular arms can be read out on a scale 10.

Figure 4:
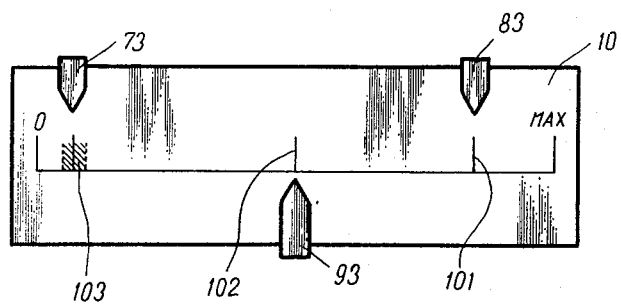

A detail view of the scale 10 is shown in FIG. 4; the scale 10 is provided with the respective mark lines, i.e. 101, 102 and 103 indicating the desired pressure value, the actual pressure value and the band of critical leakage, respectively. The reference numerals 73, 83 and 93 denote the indices belonging to the respective arms 7, 8 and 9.

The polarization of the electrodes and the uniform load thereof are substantially affected if the cover layer of the electrode is not intimately joined all over the electrode surface with its active layer; such a connection of the two layers to each other, namely, causes a good distribution of ion current, due to a continuity of the pore system in the cover layer together with that of small pores in the active layer. By separating accidentally the two layers from each other and creating a gap therebetween of e.g. 5 $\mu$m. the electrolyte is forced, at hydrogen overpressure $\Delta_p$ equalling 0.9 atm., out of the gap, and the ionic connection with the area of said active layer gets broken. A very substantial shortening of the life-time of such an electrode will be the consequence of such occurrence. If the electrodes are prepared by means of a powder metallurgy technique sometimes it is not possible to use sintering temperature ensuring the interconnection of the two layers, due to some differences in the metallurgic characteristics of the employed metals having different hydrogen overpotential, such as Pb–Ni, or due to a loss of activity of some catalysts used in the active layer e.g. Raney nickel ($Ni_{Re}$). A reliable connection of the cover layer together with the active layer can be attained in this case by interposing therebetween a thin layer (i.e. of from 0.2 to 0.3 mm.) of which pore distribution is in register with that of the cover layer and which consists of from 10 to 90 percent of material of the cover layer and of from 90 to 10 percent of the material of the active layer of the electrode. The electrode is manufactured in that pulverized mixtures of all of the layers are superimposed into a mold in the desired order and then pressed together. The particles of the identical materials both in the cover layer and the interlayer as well as the qualitatively identical particles in the interlayer and in the active layer will form, after having been pressed together, relatively strongly joined skeletons which meet in the interlayer whereby the three layers are fixedly attached to one another. The surface of the electrode does not thus contain any particle with lower hydrogen over-potential and assumes the function of the cover layer. This interlayer is apt to prolong the lifetime of the electrode as compared with an electrode without any interlayer, from 200 to more than 1000 hours of operating time.

The ratio of the constituents in the mixture designed for the interlayer depends upon the size and shape of starting powder particles. It has to be chosen in such a manner that every particle type be represented in the interlayer in a sufficient amount as to build a coherent spatial lattice, and has to be found empirically. Thus, for instance, if preparing the active layer from nickel carbonyl powder of average particle size of 5 $\mu$m. and from dry Raney nickel with 15 $\mu$m. particle agglomerates, which layer is to be provided with a cover layer of electrolytic copper powder of 7 $\mu$m. particle size, a Ni/Cu weight ratio of 3 to 5 for the interlayer has been found as optimum.

Likewise it is possible to prepare the active layer admixing the particles of the material for cover layer in order to obtain a strong connection between the two layers. The active layer can contain from 10 to 50 percent by weight of the material identical with that of the cover layer of the electrode. The electrochemical activity of such an active layer is always slightly lower, but the preparation of the electrode is, on the other hand, easier, in comparison with a three-layer electrode.

In the electrolytical hydrogen generation by means of conventional both electrode and electrolyzer types, it is not possible completely to separate hydrogen from oxygen generated. In case of the porous cathodes with a cover layer oxygen can penetrate into hydrogen dissolved in the electrolyte, only by diffusion or convection through the pores filled up with the electrolyte.

If, however, oxygen meets on this way particles behaving as oxygen reduction electrocatalyst or as catalyst of the $H_2$—$O_2$ recombination, it will be reduced either electrochemically to form hydroxonium ions, i.e. original electrolyte constituent, or chemically with previously generated $H_2$ to form water.

As a convenient electrochemical catalyst Ag and Pt have been proved. Due to their low hydrogen overpotential, however, it is necessary to place them either into the interlayer between the cover layer and the active one, or as an admixture into the active layer. The addition takes place during the preparation of the electrodes in the form of metal powder admixed to the pulverized mixture, e.g. of in a form some heat-decomposable salts thereof, such as carbonate, oxalate, oxides of Ag, chloroplatinic acid or the like, which during the sintering of the electrode in the $H_2$-atmosphere will form catalytic Ag or Pt particles, respectively. As to chemical catalyst for recombination, $Ni_{Re}$ or Pt particles have been found fairly effective if used in the same electrode regions as the afore-mentioned electrochemical catalysts. It has been found that the presence of as small amount as 10 mg. Ag per sq. m. of the geometric electrode area in the respective layers, or 25 mg.$Ni_{Re}$, or 2 mg. Pt is fully sufficient to prevent hydrogen ($H_2$) from being contaminated even with oxygen traces.

A porous electrode without particles catalysing the electrochemical reduction of oxygen, or its chemical recombination with hydrogen, will produce hydrogen contaminated with oxygen traces. Hydrogen generated by the electrode according to the invention does not contain any electrolyte aerosol, which phenomenon can be observed when using an electrode without the additional pore system. The interlayer provided between the cover layer and the active one is apt to prolong the lifetime of the electrode, if compared with a reference electrode without any interlayer, from 2,000 to more than 12,000 hours of operation time.

The porous electrode according to the present invention can be used as cathode for electrolyzing water in an electrolyzer which constitutes a source of compressed very pure hydrogen, as e.g. in laboratories having a hydrogen consumption less than 10–20 l./h. (0° C. and 760 mm. Hg.)

The operation of such a hydrogen source is incomparably safer, handier and does not require as much labor as the manipulation with a pressure cylinder.

Among other end uses there can be named

Cathode of an electrolytic manostat for maintaining a hydrogen overpressure in cases of zero gas output; or
Cathode in an electrolytic device removing oxygen, nitrogen and other inert gaseous media from less pure hydrogen, or the like.

An electrode of the above-described properties is prepared e.g. as follows:

The powder mixture for the active electrode layer is obtained, for instance, by intermixing 3 weight parts of carbonyl nickel powder, one weight part of ammonium oxalate pulverized to grain size varying within the range of from 20 to 40 micron, and one weight part of dry pulverized Raney nickel. The mixture is placed in a mold in such an amount as to give after final pressing a layer one millimeter thick. The thus prepared layer is then coated with a powder mixture comprising, for example, 30 percent by weight of electrolytic copper, 68 percent by weight of carbonyl nickel and 2 percent by weight of silver oxalate, in an amount as to give after pressing an interlayer of 0.25 millimeter thickness. Finally, the last-mentioned layer is provided with a cover layer of pulverized electrolytic copper in such an amount as to give after pressing a layer of 0.7 millimeter thickness. The layers are then pressed together under specific pressure of 900 kg./sq. cm. and finally removed from the mold. The compact piece is annealed in hydrogen atmosphere for one hour at the temperature of 450° centigrades. In this manner by thermal decomposition of ammonium oxalate, a pore system of from 10 to 15 micron average radius arises while the interstices between metallic material grains form a network of pores having radii of about one micron. The thermal decomposition of silver oxalate gives grains of metallic silver of which active surface catalytically accelerates the electrochemical oxygen reduction.

The operation of the electrolytic hydrogen source according to the invention and with reference to the apparatus as shown in FIGS. 1, 2, 3 and 4 is as follows:

Hydrogen is generated in the electrolyzer inside the porous metal electrodes containing the cover layers of which constructional principles are well known from the preparation of galvanic fuel elements. Oxygen generated in an electrolyzer on an usual non-porous anode of nickel-plated Fe sheet under atmospheric pressure can be withdrawn into the ambient atmosphere without any other measures. Thus the output of hydrogen from the cathodic system is quite independent upon the oxygen output, unlike the output in case of a conventional pressure electrolyzer.

Thus hydrogen delivered from the electrolyzer according to the invention is absolutely free of oxygen and, after a certain operation period, also of any other gaseous contaminants, since the single gas which is present in the electrolyzer outside the hydrogen system, after originally present air traces have been rinsed out, is oxygen.

The electrochemical hydrogen equivalent (1 a.h. =417.87 cu. cm. 0° 760 mm. Hg) makes it possible to calibrate the scale of the ampere-meter 5 within the electrolytic current circuit as to indicate volume units per time unit, such as, for example, cu. cm. per minute, so that the hydrogen source can assume even the function of a device for directly metering leakage of closed rooms. The taken-off hydrogen volume can be also recorded as electric quantity by means of conventional recording ampere-meters as a time function (e.g. with lab. hydrogenation processes), or as total consumption measured by an integrator. The hydrogen source equipped with such an overpressure control can simultaneously assume the function of a manostat, even at the zero offtake of hydrogen, without being necessary to use a subsidiary spurious offtake which, as a rule, cannot be omitted with mechanical manostats.

The merits of the electrolytic hydrogen source according to the invention, if compared with the well known sources, residue in the possibility of withdrawing hydrogen independently upon the oxygen offtake, in the principle of automatic prevention of the undesirable hydrogen pressure rise, in a high purity grade of the hydrogen produced, and in a very precise control of its pressure. The quantity of the electric current from the source connected to an apparatus without gas offtake may simultaneously serve as a leakage indicator of said apparatus. A high grade of safety of operation enables the source to be operated continuously without any attendance or supervision. The electrolytic hydrogen source is particularly advantageous to be used where minor consumption of highly pure hydrogen is considered.

It will be understood that each of the elements described above, or two or more together may also find a useful application in other types of constructions differing from the types described above.

While the invention has been illustrated and described as embodied in an electrolytic hydrogen source, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art clearly constitute essential characteristics of the generic or specific aspects of this invention and therefore, such adaptations should and are intended to be comprehended within the meaning and range of equivalence of the following claims.

What is new and desired to be protected by Letters Patent is set forth in the appended claims.

1. An electrolytic hydrogen source with a proportional gas generation control, comprising, in combination porous electrodes made of electrochemically active porous layer of material of which hydrophilic surface has a low overpotential for hydrogen generation, and of a physically active cover layer of hydrophilic material having a higher overpotential for hydrogen generation, the porous electrodes, including a support in which they are secured, constituting, after being wetted with an electrolyte, a pressurized vessel having an outlet and adapted to contain an electrolyte and operating up to a hydrogen overpresure, with respect to the pressure on the level of the electrolyte equalling $\Delta p = 2\delta \cdot \cos \alpha / r$ in which $\delta$ is surface tension of the electrolyte, $\alpha$ is an angle of wetting the material of electrode surface and $r$ is radius of the pores in the cover layer of the electrode; a pressure gauge adapted to communicate with the outlet of said pressurized vessel and equipped with means for scanning proportional deviations from a preset hydrogen pressure value; and an electrolyte current controlling element connected to the outlet of said pressure gauge, whereby a completely closed control circuit is formed, the electrochemically active porous layer of the electrode being separated from said cover layer thereof by a connecting interlayer.

2. An electrolytic hydrogen source as defined in Claim 1 wherein said electrochemically active layer of the electrode contains two mutually penetrating pore systems of which the one contains pores of $3\mu m$ size at the most and the other contains pores of which size is $5 \mu m$ larger than that of the pores of the first pore system.

3. An electrolytic hydrogen source as defined in Claim 1, wherein the interlayers connecting the electrochemically active layer of the electrode with the cover layer thereof is made of a material containing from 10 to 90 percent by weight of the material said upper layer is made from, and from 90 to 10 percent by weight of the material said electrochemically active layer is made from, the pore size within said interlayer corresponding to that within said cover layer of the electrode.

4. An electrolytic hydrogen source as defined in Claim 1, wherein the electrochemically active layer of the porous electrode contains from 10 to 50 percent by weight of the material identical with that said cover layer thereof is made from.

5. An electrolytic hydrogen source as defined in Claim 1, wherein the electrochemically active layer of the porous electrode contains particles of substances capable of catalytically accelerating a recombination of oxygen with hydrogen.

6. An electrolytic hydrogen source as defined in Claim 1, wherein between the electrochemically active layer of the porous electrode and the cover layer thereof there are placed particles of substances capable to catalyze an electrochemical reduction of oxygen.

7. An electrolytic hydrogen source as defined in Claim 6 wherein the particles of substances placed between the two electrode layers are capable to catalyze a chemical recombination of oxygen with hydrogen.

References Cited

UNITED STATES PATENTS

| 1,187,148 | 6/1916 | Hutchison | 320—46 |
| 3,281,640 | 10/1966 | Mas | 320—46 |
| 2,928,783 | 3/1960 | Bacon | 204—129 |

FOREIGN PATENTS

| 1,147,742 | 4/1969 | Great Britain | 204—284 |

JOHN H. MACK, Primary Examiner
W. I. SOLOMON, Assistant Examiner

U.S. Cl. X.R.

204—129, 270, 278, 284